March 24, 1942. J. M. NARDI 2,277,248
GRATER
Filed March 10, 1941 2 Sheets-Sheet 1
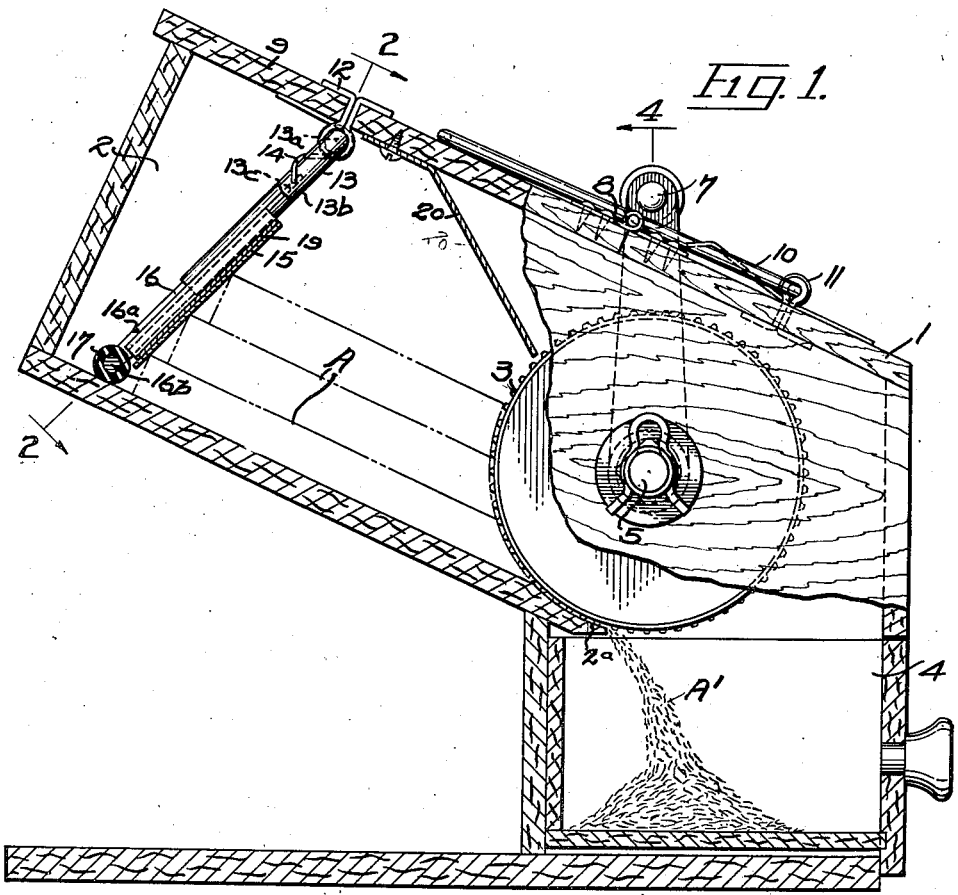
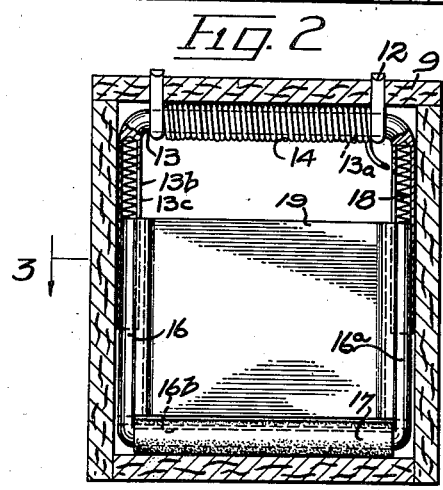
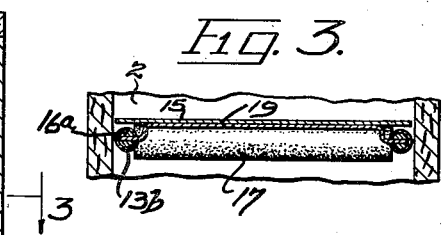
INVENTOR.
John M. Nardi March 24, 1942.   J. M. NARDI   2,277,248
GRATER
Filed March 10, 1941   2 Sheets-Sheet 2
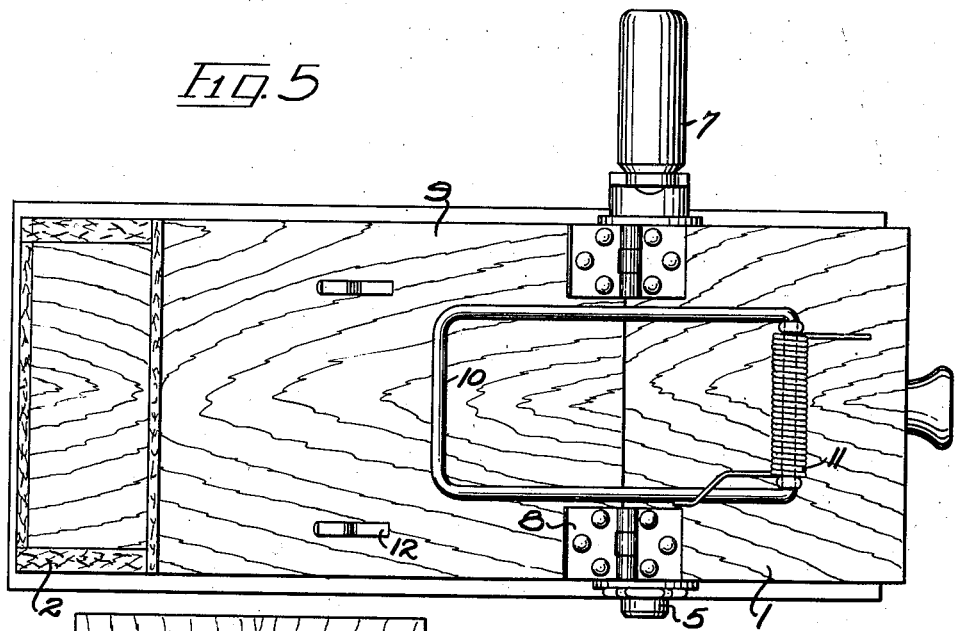
INVENTOR.
John M. Nardi
BY
his Attorney.

Patented Mar. 24, 1942

2,277,248

UNITED STATES PATENT OFFICE 2,277,248

GRATER

John M. Nardi, Detroit, Mich.

Application March 10, 1941, Serial No. 382,535

4 Claims. (Cl. 146—177)

This invention relates to improvements in graters, and refers primarily to cheese graters.

It is an object of the invention to provide a simple form of grater including a rotary grating member, and spring actuated feeding mechanism for forcing the cheese or other material to be grated towards the grating member.

Another object of the invention is to provide a grater including a receptacle for the material to be grated, spring means for retaining a cover on the receptacle in closed position, and a pivoted spring actuated feeding member for forcing the material to be grated into contact with the grating member including a spring actuated extension telescopically mounted on the feeding member so that throughout the pivotal movement of the latter the extension remains in contact with the base of the receptacle.

A further object of the invention is to provide such a grater which is relatively cheap and simple to manufacture and dependable in operation.

Having thus briefly stated some of the objects and advantages of the invention I will now proceed to describe a preferred embodiment thereof with the aid of the accompanying drawings, in which:

Figure 1 illustrates a side view of the invention partly in section.

Figure 2 is a section on the line 2—2 of Figure 1.

Figure 3 is a section on the line 3—3 of Figure 2.

Figure 4 is a section on the line 4—4 of Figure 1, and

Figure 5 shows a plan view.

Referring to the drawings, 1 designates a casing having a receptacle 2 formed in its upper portion to receive cheese or other material A to be grated. Extending transversely at one end of the receptacle is a rotary grating member 3 the lower side of which is so spaced from one extremity 2a of the receptacle base that grated material A' drops therebetween into a removable drawer 4 slidably mounted in the lower portion of the casing 1. The grater member is mounted upon a spindle 5 for rotation therewith, and the latter is supported in bearings 6 arranged in opposite sides of the casing 1. Any preferred means may be employed for turning the spindle, the mechanism shown in the drawings consists of a cranked handle 7 mounted on one extremity of said spindle.

Provided upon the top of the casing 1 are hinges 8 which support a cover 9 for the receptacle 2. Pivotally mounted, also upon the top of the casing 1, is a holding member 10 which is normally pressed down upon the top of the cover 9 by a spring 11 to retain the cover in closed position. Pivotally mounted as by split pins 12 upon the inner side of the cover 9 is a U-shaped feeding member 13 consisting of two spaced, parallel tubular arms 13b connected by an integral intermediate portion 13a engaged by the said split pins 12. The arms 13b move adjacent opposite sides of the receptacle 2 and are urged to rotate about the axis of their intermediate portion 13a by a spring 14, to push the material A to be grated against the grating member 3. Secured to the arms 13b and extending between them is a pusher plate 15.

16 indicates a U-shaped extension member having opposed legs 16a mounted for axial movement in the tubular arms 13b and connected at their lower extremities by an integral intermediate portion 16b around which a roller 17 is provided which is normally held against the base of the receptacle by helical springs 18 mounted in the arms 13b to urge the legs 16a downward. Any suitable means may be provided for preventing complete disengagement of the legs 16a from the tubular arms 13b, in the present instance the opposite ends of the springs 18 are secured to the inner ends of the tubular apertures in the arms 13b and to the ends of the legs 16a. The inner sides of the arms 13b are longitudinally split at 13c for the passage of a supplemental plate 19 the vertical margins of which are secured to the opposed inner faces of the legs 16a. This supplemental plate lies immediately behind the pusher plate 15 and is intended for movement in a plane parallel thereto. 20 denotes a deflector plate which may be secured to the inner side of the cover 9 to prevent material to be grated being accidentally loaded upon the top of the rotary grating member 3.

The method of operation is as follows: The cover 9 is raised against the spring tension exerted thereon through the holding member 10, and material A to be grated is then inserted in the receptacle 2. Before the cover 9 is lowered the feeding member 13 is swung away from the grating member 3 so that when lowered it exerts spring pressure against the material A to force it against the grating member. The crank 7 is then turned and the material gradually grated whereupon it drops into the drawer 4 as indicated at A'. As the material A is moved towards the grating member and the feeding member 13 swings upward the springs 18 retain the roller 17 against the base of the receptacle 2. The pusher plate 15 and the extension pusher plate 19 distribute the pressure over the entire rear surface of the material being forced towards the grating member.

While in the foregoing the preferred embodiment of the invention has been described and shown, it is understood that the construction is susceptible to such alterations and modifications as fall within the scope of the appended claims.

What I claim is:

1. A grater comprising a receptacle to contain material to be grated, a rotary grating member extending across the receptacle and spaced from the base thereof to permit passage of grated material therebetween, a spring closed cover on said receptacle, a feeding member pivoted on the underside of said cover, said feeding member being adapted to force material to be grated towards said grating member, spring means urging said feeding member against said material, an extension member carried by the feeding member for sliding movement relative thereto towards and from said base, and means tending to retain said extension member against the base of said receptacle during the pivotal movement of the feeding member.

2. A grater comprising a receptacle to contain material to be grated, a rotary grating member extending across the receptacle and spaced from the base thereof to permit passage of grated material therebetween, a spring closed cover on said receptacle, a U-shaped feeding member pivoted on the underside of the cover having spaced opposed arms lying adjacent opposite sides of the receptacle, a pusher plate extending between said arms, spring means tending to turn the feeding member and force the arms and pusher plate against material to be grated and said material against the grating member, and extension member carried by said arms for sliding movement relative thereto towards and from the said base, said extension member including a supplemental pusher, and means tending to retain the underside of the extension member in contact with the base of the receptacle as the feeding member is turned pivotally.

3. A grater comprising a receptacle to contain material to be grated, a rotary grating member extending across the receptacle and spaced from the base thereof to permit passage of grated material therebetween, a spring closed cover on said receptacle, a U-shaped feeding member pivoted on the underside of the cover having spaced tubular arms lying adjacent opposite sides of the receptacle, a pusher plate extending between said arms, spring means tending to turn the feeding member and force the arms and pusher plate against material to be grated and said material against the grating member, a U-shaped extension member including parallel legs telescopically carried by said arms, springs carried by the latter tending to retain the central portion of the extension member adjacent the base of the receptacle, and a supplemental pusher plate extending between the legs and movable in a plane parallel with the first named pusher plate.

4. A grater comprising the combination set forth in claim 3 wherein means are provided for preventing disengagement of the extension member from the feeding member.

JOHN M. NARDI.